(12) United States Patent
Wyborn et al.

(10) Patent No.: US 8,368,693 B2
(45) Date of Patent: Feb. 5, 2013

(54) SYSTEMS AND METHODS FOR FAST REAL-TIME RENDERING OF MULTIPLE LIGHT SOURCES

(75) Inventors: Rowan Wyborn, Page (AU); Mathi Nagarajan, Nicholls (AU)

(73) Assignee: Take Two Interactive Software, Inc., New York, NY (US)

( * ) Notice: Subject to any disclaimer, the term of this patent is extended or adjusted under 35 U.S.C. 154(b) by 933 days.

(21) Appl. No.: 12/195,410

(22) Filed: Aug. 20, 2008

(65) Prior Publication Data
US 2010/0045676 A1  Feb. 25, 2010

(51) Int. Cl.
*G06T 15/00* (2011.01)
(52) U.S. Cl. ........ 345/426; 345/419; 345/503; 345/506; 345/614; 345/660
(58) Field of Classification Search .......... 345/426, 345/428, 503, 660, 419, 506, 613, 614
See application file for complete search history.

(56) References Cited

U.S. PATENT DOCUMENTS

| | | | | |
|---|---|---|---|---|
| 5,880,736 A | * | 3/1999 | Peercy et al. | 345/426 |
| 6,340,972 B1 | * | 1/2002 | Fox | 345/426 |
| 6,384,833 B1 | * | 5/2002 | Denneau et al. | 345/522 |
| 6,504,538 B1 | * | 1/2003 | Freund et al. | 345/426 |
| 7,006,090 B2 | * | 2/2006 | Mittring | 345/426 |
| 7,154,395 B2 | * | 12/2006 | Raskar et al. | 340/572.4 |
| 7,548,238 B2 | * | 6/2009 | Berteig et al. | 345/426 |
| 7,738,725 B2 | * | 6/2010 | Raskar et al. | 382/266 |
| 7,864,176 B2 | * | 1/2011 | Planck et al. | 345/424 |

OTHER PUBLICATIONS

Ikedo et al., hardware Implementation of Shading Modules in an Application Specific Integrated Circuit, SMA Mar. 1997, pp. 150-159.*

* cited by examiner

*Primary Examiner* — Phu K Nguyen
(74) *Attorney, Agent, or Firm* — Kenyon & Kenyon LLP

(57) ABSTRACT

Example embodiments of the present invention include systems and methods for the efficient rendering of multiple light sources, each controlled individually, in a single pass. An example embodiment encodes the light sources in a texture map, such as DXT. Each channel of the multi-channel texture map encodes data associated with a light source. The pixel shader then renders multiple light sources according to the multiple channels of the texture. Additionally, the pixel shader may render multiple textures, and thus render an even greater number of individual light sources. In a further embodiment, the rendering of a plurality of individually controlled light sources is accomplished in a single pass.

20 Claims, 7 Drawing Sheets

Fig. 2A

| 5 | 8 | 5 | 3 | 1 | 1 | 1 | 1 |
|---|---|---|---|---|---|---|---|
| 5 | 8 | 5 | 3 | 1 | 1 | 1 | 1 |
| 6 | 9 | 6 | 3 | 1 | 1 | 1 | 1 |
| 6 | 9 | 6 | 3 | 1 | 1 | 1 | 1 |
| 6 | 9 | 6 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 6 | 10 | 6 | 2.5 | 1 | 1 | 1 | 1 |
| 4 | Source 220 | 4 | 2 | 1 | 1 | 1 | 1 |

Fig. 2B

| 1 | 1 | 2 | 4 | 4 | 4 | 4 | 4 |
|---|---|---|---|---|---|---|---|
| 1 | 1 | 2 | 4 | 6 | 6 | 6 | 4 |
| 1 | 1 | 2 | 4 | 6 | Source 210 | 6 | 4 |
| 1 | 1 | 2 | 4 | 6 | 6 | 6 | 4 |
| 1 | 1 | 2 | 4 | 4 | 4 | 4 | 4 |
| 1 | 1 | 2 | 2 | 2 | 2 | 2 | 2 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig. 2C

| 5 | 8 | 5.5 | 4 | 4 | 4 | 4 | 4 |
| --- | --- | --- | --- | --- | --- | --- | --- |
| 5 | 8 | 5.5 | 4 | 6 | 6 | 6 | 4 |
| 6 | 9 | 6.5 | 4.5 | 6 | Source 210 | 6 | 4 |
| 6 | 9 | 6.5 | 4.5 | 6 | 6 | 6 | 4 |
| 6 | 9 | 6.5 | 4.5 | 4 | 4 | 4 | 4 |
| 7 | 10 | 7.5 | 3.5 | 2 | 2 | 2 | 2 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 7 | 10 | 7 | 3 | 1 | 1 | 1 | 1 |
| 6 | 10 | 6 | 2.5 | 1 | 1 | 1 | 1 |
| 4 | Source 220 | 4 | 2 | 1 | 1 | 1 | 1 |

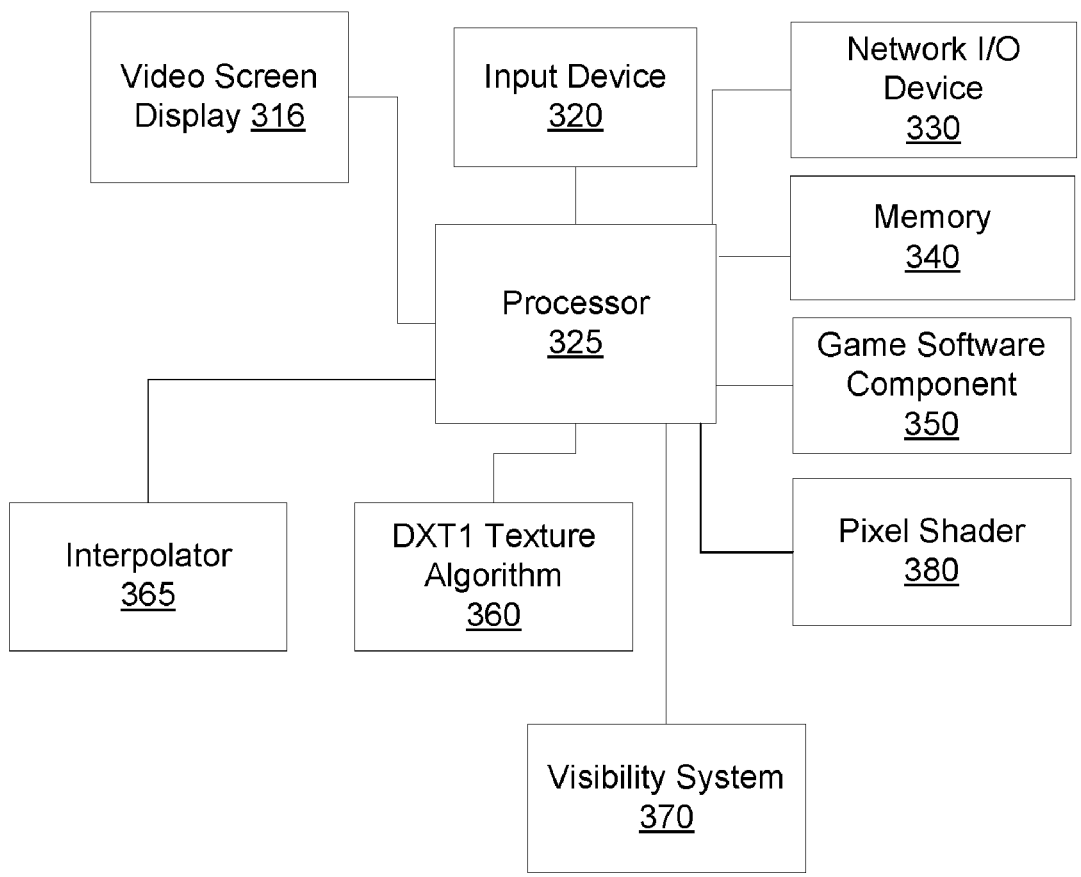

SYSTEMS AND METHODS FOR FAST REAL-TIME RENDERING OF MULTIPLE LIGHT SOURCES

FIELD OF THE INVENTION

The present invention relates generally to the efficient rendering of a plurality of individual light sources using three-dimensional computer graphics.

BACKGROUND

Some manufacturers of video games, especially first-person shooter (FPS) video games that emulate the game world from the perspective of the player-character, strive to provide realistic interactive environments to enhance the gaming experience. For example, one such realism effect may include a depiction of one or more light sources of varying geography, intensity, color, etc. Many games create large areas of artificial environment for a player to explore using three-dimensional graphics. Three-dimensional graphics typically include a plurality of markers and other descriptive information (e.g., texture data). Then, in actual presentation, the markers and/or other data are passed to a "rendering engine" which renders the current image to be displayed on the screen. Unlike a fixed presentation movie however, game graphics often provide a huge number of visual configurations since a FPS game character is provided multiple options in its exploration and interaction within the game environment. Since the number of configurations can be far too large to store each possible screenshot in memory, the game is rendered in real-time. This may mean that a game control engine controls the markers and other data according to user input, and passes updated data to the rendering engine, which then renders each frame (e.g., 30 or 60 frames per second). This real-time rendering of the scene can place an enormous computational burden on the system resources. And, expectedly, the computational burden increases in proportion to the level of detail and resolution given to the graphics. In order to provide greater performance, without too great of a computational burden, a need exists for better production of "realistic" light sources in a resources-affordable manner.

BRIEF DESCRIPTION OF THE DRAWINGS

FIG. 2A shows an example attenuation map which may be used in conjunction with an example embodiment of the present invention.

FIG. 2B shows an example attenuation map which may be used in conjunction with an example embodiment of the present invention.

FIG. 2C shows an example aggregate attenuation map which may be used in conjunction with an example embodiment of the present invention.

FIG. 3 shows a block diagram illustrating an example system embodiment of the present invention.

DETAILED DESCRIPTION

Figure 1A:
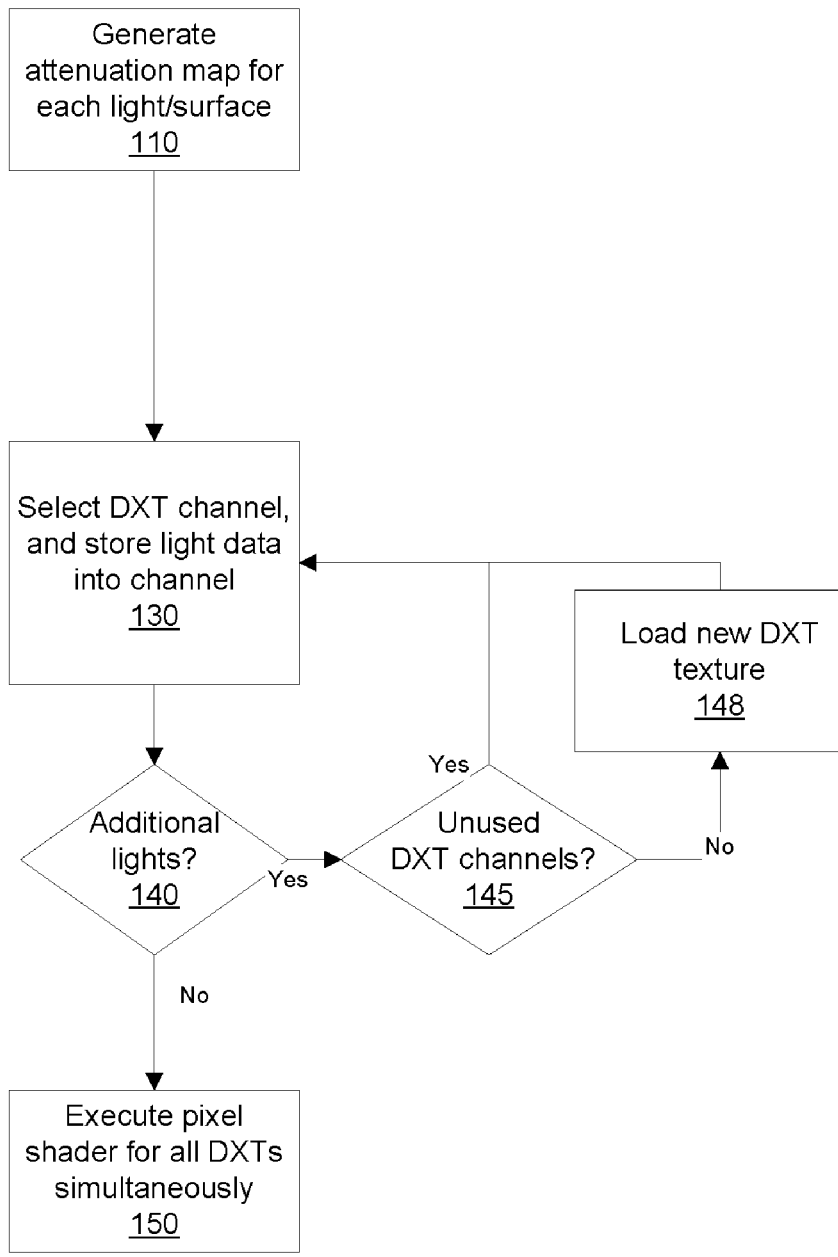
FIG. 1A shows a flowchart illustrating an example method embodiment of the present invention.

Example embodiments of the present invention include systems and methods for efficient rendering of light sources in a three-dimensional graphics environment. Such example embodiments may be applied to other environments as well.

Traditionally, lighting effects of a three-dimensional environment were grossly approximated as a single effect regardless of the number of sources. The result of this would be inaccurate (e.g., unrealistic) lighting effects and a low level of individual control. For example, all lights in a single environment would necessarily have to be the same color, or be individually rendered at great (e.g., intolerable) computational cost.

Systems and methods of the present invention relate to the fast rendering of more than one light source. Specifically, the rendering is done in a single-pass. The example embodiments allow the multiple light sources to be rendered individually, while still maintaining a single-pass render. The result of this is that each light source can produce its own effect on the environment (though still approximated and compressed to a degree), and each light may be controlled individually (e.g., different intensities, different colors, etc.).

Particle lighting systems are challenging for a variety of reasons. A complicated environment would likely include more than one light source. However, available multi-pass lighting techniques may not be optimal to use because a typical particle system would be rendered in a single draw, would be "alpha blended," and would be self overlapping. Rendering this type of system with multiple passes would produce visually incorrect results. To ensure the proper visual presentation, e.g., in areas where multiple light sources overlap, the particle lighting system should be rendered in a single pass.

In an example embodiment of the present invention, a scene is rendered, and includes at least one or more of the following steps:

A) Use the visibility system to determine which surfaces are visible. For example, this may be done by traversing a BSP data structure to determine which leaves are visible. Any objects or surfaces that are associated with the BSP leaf may be considered visible and added to a visibility set.

B) For each object or surface in the visibility set:

B1) If the object is a static object then:

B1a) Look at the prebuilt list of attenuation maps to determine which static lights hit the surface. In an embodiment, attenuation maps are stored in different channels of one or more textures. In an embodiment, the attenuation information is stored with each vertex of the object, instead of in an attenuation map.

B1b) Send to the main pixel shader information about each light. In an embodiment, the information needed by the pixel shader includes at least one of: hdr color, world space position and the attenuation map (e.g., which texture and/or which channel the attenuation map is stored in, and/or which vertex component and/or channel).

In an embodiment, the world space position, and attenuation map information does not change during the game, but one can freely change the hdr color. In an embodiment, one may pass to the pixel shader other properties for each light. For example, one may also pass a shadow channel selector if the light is a shadow casting light. In an embodiment, it is not necessary to send information about whether the light is a point light, spot light or directional light as this information is already encoded into the attenuation maps. In an embodiment, depending on the implementation the vertex shader organizes the data that it passes to the pixel shader so that the order in which lights are given to the pixel shader automatically determines the location of the attenuation data (e.g.: first light comes from channel 1 of the first texture, second light comes from channel 2 of the first texture, light 3 is from channel 3 of texture 1, light 4 is from channel 1 of texture 2, . . . ). This may generally reduce the complexity of the pixel shader, allowing it to execute more quickly.

B1c) Render the object using the main pixel shader with the data provided in step B1b).

B2) In an embodiment, if the object is dynamic then:

B2a) Use approximations to render multiple lights in a single pass, and/or render the object in multiple passes.

In an embodiment of the present invention, methods and systems are provided for rendering individual lights in a graphics environment, including: storing a plurality of sets of data in a single texture, where each set of data is associated with a light source in the graphics environment, and rendering a display of a graphic environment that includes at least some of the light sources with the ability to more accurately render specular reflection effects from affected surfaces for each light and the ability to dynamically change the light color and intensity of each light independently.

FIG. 1A illustrates an example method, according to an example embodiment of the present invention. At 110, the example method generates an attenuation map for each light and each surface. The attenuation map could be stored in any number of formats, e.g., an eight-bit grayscale map. The attenuation map stores information about each light source, the dispersal pattern on each light source, and various other traits, such as shadows, intensity, etc. The maps, at least for static light sources, will remain the same throughout execution and rendering. Therefore, the attenuation maps are advantageously constructed prior to execution, and stored for reference during execution. The maps may be constructed and stored for every light and surface, or alternatively the attenuation information may be stored for every vertex. The actual rendering of the light can then be performed as a product of the reflection model term (e.g., Blinn-Phong), the color term (e.g., high dynamic range (HDR) color), and the attenuation map. E.g.:

(Blinn-Phong Term)*light HDR color*attenuation map

The Blinn-Phong term is a reflective model term provided by an available pixel shading algorithm. The term is constructed based on the product of the diffuse term, and the sum of the normalized light source (N·L) and normalized "halfway" vector (which itself is calculated as the viewing angle plus light source angle, divided by the absolute value of the viewing angle plus light source angle. E.g.:

(Blinn-Phong Term)=diffuse*$(N \cdot L)+(N \cdot H)^k$, where

H=(L+V)/|L+V|,

L=the light source angle,

V=the viewing angle, and

N=the normalized surface normal.

In FIG. 1A, after the attenuation map is constructed at 110, the example method will begin encoding the light data into one of three DXT1 channels. At 130, the example method may select an available DXT1 channel to store the light data (e.g., attenuation map) in. An attenuation channel selector will be associated with the light source, to keep track of which DXT1 channel the light source data is stored in. The attenuation channel selector could be a vector of values including zero and one, which correspond to the channels of a texture. The channel selectors may be 4 component vectors that are set to (1,0,0,0) for the first channel, (0,1,0,0) for the second channel, (0,0,1,0) for the third channel and (0,0,0,1) for the fourth channel. DXT1 textures only have three channels, and thus when applied to a DXT1 texture, the fourth vector selector (e.g., 0,0,0,1) would never be used. However, since most textures include a fourth channel (e.g., the RGB of DXT1 and an alpha channel), and those textures could be used in other aspects and related aspects of the overall graphics engine, the channel selector has a fourth vector configuration for selecting that forth channel. E.g.:

(Blinn-Phong Term)*light HDR color*(Light Attenuation), where (Light Attenuation)=the dot product of (attenuation channel selector, attenuation map).

It should be noted that the three DXT1 channels are labeled red, green, and blue, which corresponds to those respective colors (i.e., storing texture data for those respective colors) in the traditional image texture application of a DXT1. However, here, the channels are being used to store light data, and not data concerning one of the three "primary" computer colors used to create an output color. As such, the color of the light source (e.g., light HDR color) and the color label associated with the DXT1 channels are not related. The DXT1 may store three lights of the same color, or different colors, without any correlation to the color labels of the DXT1 channels.

The example method may then continue (e.g., at 140) until all of the light sources have been encoded. At 145 and 148, the example method will load a new DXT1 texture as needed, since each DXT1 texture holds data for a maximum of three light sources. Compressing the attenuation data into DXT1 textures should yield a compression ratio of 6:1, but through adjustments may produce compression ratios of greater or lesser magnitude. Regardless of the compression ratio achieved by specific embodiments of the present invention, the memory savings of the DXT1 compression should create a performance enhancement and provide a more efficient rendering of the light sources.

DXT1 represents a core compression strategy, but from that core foundation many compression variations are possible. Several commercial and proprietary compression implementations based on the DXT1 standard are available in the art. Since the DXT1 is designed to encode actual surface textures, and not light source data, implementations of example embodiments of the present invention may find that the light source encoding is highly sensitive to the specific compression algorithm used. Though any number of compression algorithms can be used, including algorithms developed in the future, implementations may find the ATi Compressonator™ to be a useful selection in terms of performance and visual result.

Once the DXT1 encoding is completed, at 150, the pixel shader may execute during the real-time rendering of the three-dimensional environment (e.g., during game play). The pixel shader is the tool responsible for taking all the stored data (e.g., attenuation maps) and real-time data (e.g., current camera viewing angle) and rendering the displayed environment. In example embodiments of the present invention, the main pixel shader determines how each given light source affects a given pixel, then accumulates the result for all lights. A given light source may affect a given pixel by, for example, a Blinn-Phong term (to facilitate normal mapping quality, even on specular objects), multiplied by the light color (e.g., the HDR color), multiplied by any attenuation on the light, where light attenuation may include shadows, obstructions, or other light fading properties. The attenuation maps are stored in a DXT channel (e.g., one light source per channel), and are read by the pixel shader during the scene rendering. Reading a single DXT will render up to three light sources at the same time. Additionally, the pixel shader may read more than one DXT texture in a single pass. However, as more calculations for more lights are performed, the shader becomes more complex and performance would be impacted. The main limiting factor is that for each DXT light data texture, interpolators are needed to pass information from the vertex shader to the pixel shader. Currently, hardware supports around sixteen interpolators. The interpolators perform a variety of tasks, and usually cannot be exclusively tasked with handling the light data. Under current standards, 5 to 6 DXTs could be rendered in a single pass without serious demands on the interpolators. Therefore, even 15 to 18 individual lights can be rendered in a single pass using embodiments of the present invention. As hardware improves, and the number of interpolators is increased, additional light sources may be included for single-pass rendering.

During execution, all of the lighting data is kept in the world space. The light is then turned into a tangent space 4 by 3 matrix, and passed to the pixel shader for calculation. The information for each light is stored entirely in pixel shader constraints. This configuration uses only 3 interpolators, and frees the remaining interpolators to process the DXT textures. It may be appreciated that the code that executes is invariant to light type. For example, the lighting fall-off, such as that which would be produced by a spotlight cone, is encoded in the attenuation map, and stored in the DXT texture. The actual rendering may be performed in a static branching loop. Unrolling the loop may yield, e.g., a 2-3× performance speedup for the shader, but may also require the compilation of a large number of shader permutations. Each light will have a number of permutations, and each permutation will have to be calculated for each material in the environment, which itself may cause a performance degradation. Thus, specific implementations may find it advantageous to implement some combination of looped static branching and some executing of unrolled loop instructions. Other embodiments may forego any speed-up from unrolling the loop, and use only the static branching implementation.

Figure 1B:
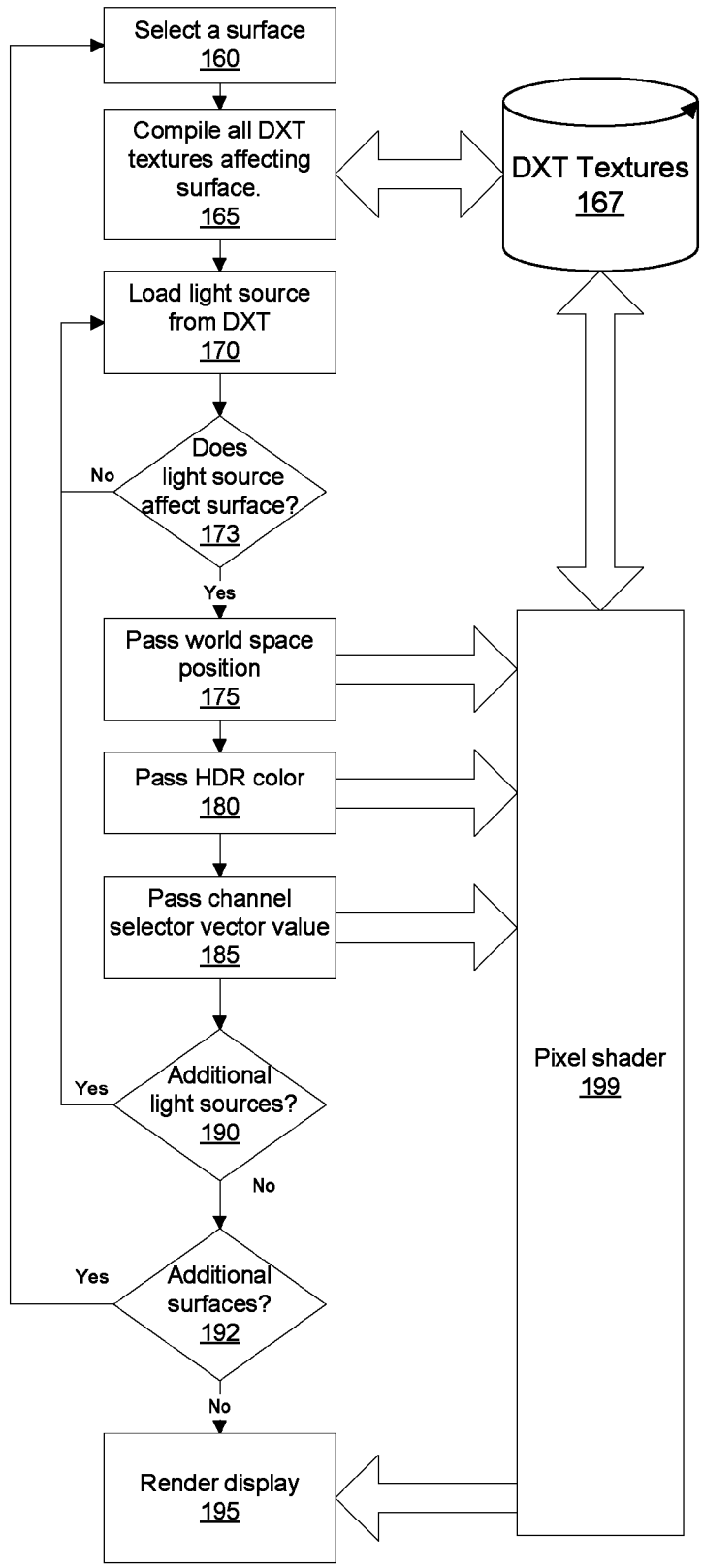
FIG. 1B shows a flowchart illustrating an example method embodiment of the present invention.

FIG. 1B illustrates the execution loop described above, according to another example embodiment of the present invention. A display that needs to be rendered by the pixel shader could contain several surfaces requiring rendering, and each surface may be affected by one or more light sources. At 160, the example method selects one of the surfaces located in the visible area. At 165, the example method compiles all of the DXT textures that affect that particular surface (e.g., by loading the DXT textures for a DXT texture database 167). Then, at 170, the example method loads a light source from one of the DXT textures, and at 173 the example method checks to see if this particular light source affects the particular surface. If it does not, the example method returns to 170 to load the next light source. If the light source does affect the surface, then the example method provides several relevant pieces of information to the pixel shader. First, at 175, the example method passes the world space position of the light source to the pixel shader. Then, at 180, the example method passes the color attribute, and at 185 the example method passes the channel selector vector value. This data, as well as the source data contained in the actual DXT textures (e.g., from DXT texture database 167), the pixel shader has enough information to render the scene with respect to the one surface and one light source. At 190, the example method returns to 170 if there are additional light sources in the set of DXTs affecting the current surface. Once all the light sources have been checked and compiled, at 192, the example method will return to 160 if there are additional surfaces in the visible scene that need to be analyzed. As mentioned earlier, the example methods can render multiple sources and multiple DXTs in a single pass. Therefore, as indicated by 195, once all of the light sources for all of the surfaces have been checked and analyzed, the pixel shader 199 will render the final display. The example method is shown in a linear progression for illustrative purposes, but regardless of the actual implementation of execution, the multiple light sources and multiple surfaces will be rendered in a single pass (e.g., at 195).

Figure 1C:
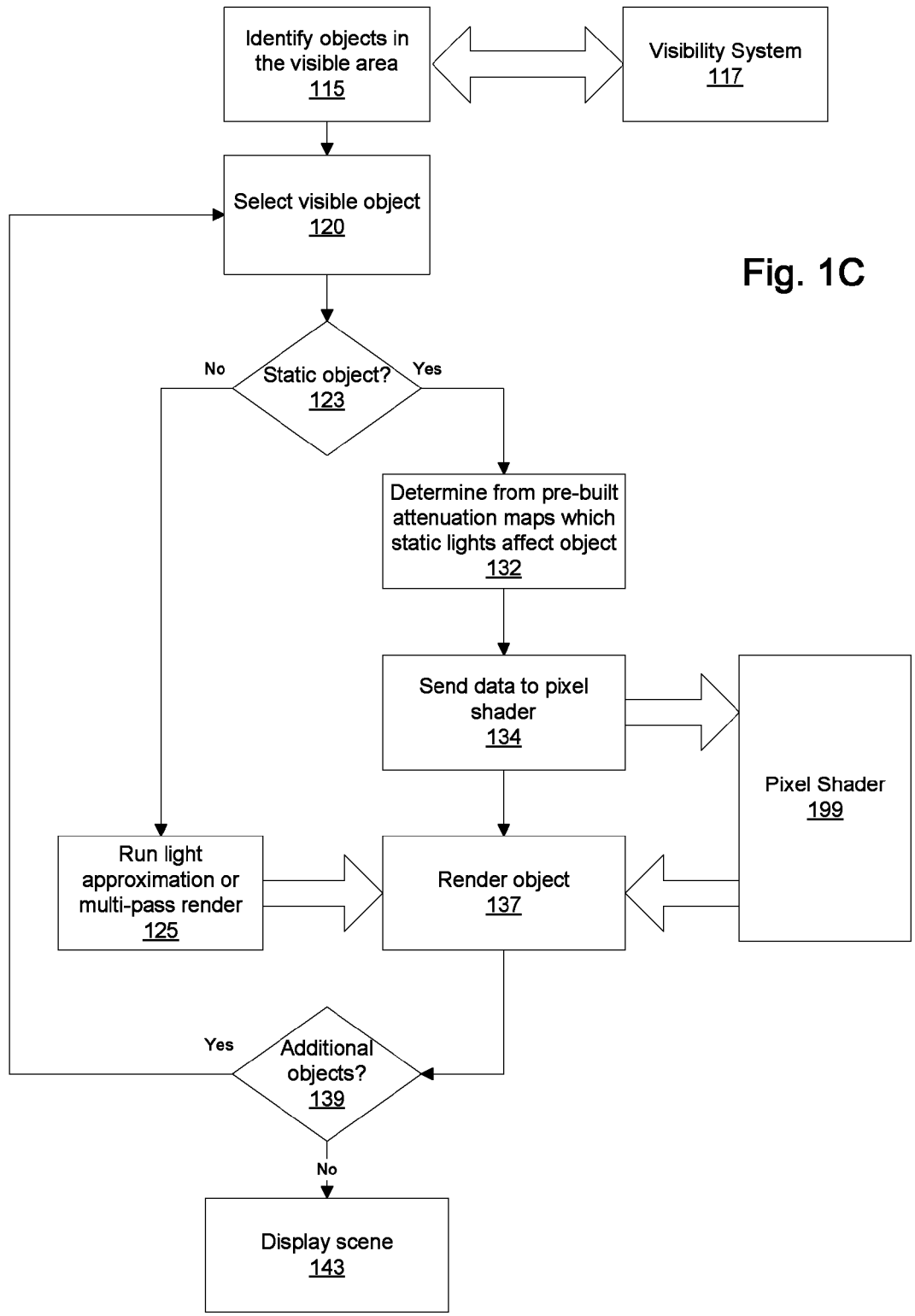
FIG. 1C shows a flowchart illustrating an example method embodiment of the present invention.

FIG. 1C illustrates an example method embodiment of the present invention. This example method illustrates an example of how the rendering process is executed. First, at 115, the example method will identify objects (e.g., surfaces) in the visible area. This may be, for example, the area of the three-dimensional environment that the player is currently looking at, and therefore must be rendered for presentation on the display (e.g., computer monitor or television). This step may access a visibility system 117, which includes a binary space partitioning (BSP) method to pre-compute which sections are visible at a given time. As known in the art, BSP uses multiple intersecting planes to partition the scene into sectors. Each of the planes divides the space through which it passes into two spaces; thus, the multiple intersecting planes form convex polygons called leaves. In an example embodiment, the game further uses portals to manage which leaves are visible at a given time. This increases the system efficiency, since only visible leaves need be redrawn The visible scene may contain a large number of objects, and at 120 the example method selects one of the objects. At 123, the example method determines if the selected object is a static object. If the object is not static (e.g., does not remain in a fixed position within the world space), then the object will not have preprocessed attenuation data (as that data is changing in real-time as the object moves). Regarding 125, since example embodiments of the present invention store preprocessed attenuation maps in DXT textures for concurrent execution, without preprocessed attenuation maps (e.g., for dynamic objects), the graphics engine resorts to traditional rendering techniques of approximating the multiple lights into one source and/or running a multi-pass render. If the object is static, then at 132, the example method determines from one or more pre-built attenuation maps, which static lights affect the object. Attenuation maps are stored in different channels of one or more textures. The attenuation information could also be stored with each vertex of the object, instead of in an attenuation map.

At 134, the example method sends the required data to the pixel shader (e.g., 199) for each light. The information needed by the pixel shader includes: color (e.g., HDR color), world space position, and the attenuation map (e.g., which DXT texture and which channel the attenuation map is stored in). Alternatively, if the attenuation information is stored per vertex instead of in a map, then the pixel shader receives a vertex component and channel vector. At 137, using the pixel shader, the object is rendered based on the passed data. At 139, the example method loops back to 120, and continues the example method for all visible objects. Once all objects have been rendered (e.g., in a single pass) the rendered scene is displayed (e.g., on a display to a game player). The world space position of a static object (e.g., a static light source, or static object affected by a light source) does not change during game play. Also, the attenuation map information does not change during game play. However, in a benefit of example embodiments of the present invention, the color (e.g., HDR color) attribute may freely change during game play, and the color of each light source can be individually controlled in real-time while still being rendered in a single pass. Other information may also be passed to the pixel shader for each light, such as shadow channel selector information. It is not necessary to send information about whether the light is a point light, spotlight, or directional light, as this information is encoded in the attenuation maps. The information passed to the pixel shader may be passed in any order. However, depending on the implementation, it may be more efficient for the vertex shader to organize the data that it passes to the pixel shader so that the order in which lights are given to the pixel shader automatically determines the location of the attenuation data (e.g., first light comes from channel one of the first texture, second light comes from channel two of the first texture . . . fourth light comes from channel one of the second texture, etc.). This may reduce pixel shader complexity in some implementations, allowing for a quicker execution.

FIG. 2A illustrates an example attenuation map. The map is shown as a two-dimensional illustration. The attenuation map is merely a set of data constraints (e.g., a matrix of light attributes), and may be stored in a data structure that does not resemble a traditional map at all. The particular example map illustrated in FIG. 2A shows a focused light source (e.g., a spotlight). The map illustrates light intensity for various areas according to the position of the source. Though only intensity is stored in this illustration, any other amount and type of data may be stored in the attenuation map data structure. The attenuation maps may be constructed for each light, such that each map only shows the data for one light (e.g., as illustrated in FIGS. 2A and 2B). The illustration in FIG. 2A shows a partitioned rectangle (e.g., a room that a game player may enter). Each partition stores data representing the intensity of light in that partition. As shown in the figure, the light from source 220 provides 10 units of intensity immediately in front of the source, and gradually reduces in intensity as it approaches the opposing wall. The partitions immediately adjacent to the partitions immediately in front of the source show a rapid "drop-off" in intensity, as would be expected from a confined beam of light, such as a spotlight. Three partitions away from the most intense light shows a complete drop off to the base level of light (e.g., 1).

FIG. 2B is similar to FIG. 2A, and illustrates an attenuation map for an unconfined light source (e.g., a candle or uncovered light bulb). Source 210 is dimmer than source 220, as shown by the lower initial number adjacent to the source (i.e., 6). Source 210 has a more gradual light drop-off in the partitions farther from the source, as would be expected from an unconfined light source. The light eventually drops off to a base level light of 1. The base level may be higher or lower (e.g., zero) depending on the environment.

FIG. 2C illustrates an effect of execution. Both light sources from FIGS. 2A and 2B are shown on the same map. Only one light source is typically stored in an attenuation map. However, as an advantage of the present invention, multiple light sources can be individually rendered and combined in a single-pass. FIG. 2C illustrates the effective execution or rendering of the two sources of FIGS. 2A and 2B. As the individual light sources are simultaneously rendered by the pixel shader, the aggregate of the lights is accounted for. Thus, intensities of 5.5, 6.5, and 7.5 are found in the partitions between the two lights, where intensities of 5, 6, and 7 are found in the corresponding partitions of the opposite side of source 220. This illustrates the effective combination of these two light sources, as experienced by surfaces located in partitions between the sources.

FIG. 3 illustrates an example system 300, according to an example embodiment of the present invention. This may be, for example, a personal computer executing a game that includes three-dimensional graphic environments, according to example embodiments of the present invention. The example system has a processor 325 in communication with several other components. The processor 325 may be a general purpose central processing unit, other microprocessor, or include several processors, such as a central processing unit and graphics processing unit. The example system has a video screen display 316, which may be a CRT, LCD, plasma, or any other known or future video display technologies. The video screen display 316 could include an input device (e.g., touch screen), and/or the system could have other input devices 320 (e.g., a mouse, keyboard, etc.). The example system has a memory 340, which may include any combination of cache levels, RAM, ROMs, solid-state memory, or other disk based memory (e.g., hard-drives, CD-ROMs, etc.). The example system could have a wireless or wired network I/O device 330. These devices are just some of the common system devices available in the art, and other embodiments may include additional or fewer components.

Additionally, the example system may have a game software component 350, which includes software instructions to execute implementations of example methods, according to example embodiments of the present invention. Accordingly, the example system could have a pixel shader 380, used to render the three-dimensional environment for the executing game software component 350. The example system may have one or more (e.g., 16) interpolator(s) 365. Further, the example system may have a DXT1 texture algorithm 360 to support the encoding of 1-3 light sources in the three channels of DXT1 textures. The attenuation maps and other light source data, may be stored in memory 340, until needed by the pixel shader 380. Example system 300 includes a visibility system 370, which may be responsible for executing the BSP method described above.

It should be understood that there exist implementations of other variations and modifications of the invention and its various aspects, as may be readily apparent to those of ordinary skill in the art, and that the invention is not limited by specific embodiments described herein. Features and embodiments described above may be combined in various ways. It is therefore contemplated to cover any and all modifications, variations, combinations or equivalents that fall within the scope of the basic underlying principals disclosed and claimed herein.

It will be appreciated that all of the disclosed methods, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, and procedures.

What is claimed is:

1. A method performed via a processor for rendering individual lights in a graphics environment, comprising:
   storing a plurality of sets of data in a single texture, where each set of data is associated with a different light source in the graphics environment, and
   rendering a display of a graphic environment that includes a surface affected by at least some light sources, where the rendering includes rendering specular reflection effects on the surface for each light affecting the surface, where a first specular reflection effect from a first light source is independent of a second specular reflection effect from a second light source.

2. The method of claim 1, wherein the rendering is done in a single pass.

3. The method of claim 1, wherein the texture contains a plurality of channels and one set of data is stored in a single channel of the texture.

4. The method of claim 1, wherein the texture is a DXT texture.

5. The method of claim 1, further comprising:
    executing software that includes graphics environments, wherein the display is based at least in part on the executing software.

6. The method of claim 5, wherein the executing includes adjusting the color or intensity of a particular light source, where the adjustment is independent of every other light source;
    wherein the display includes a surface affected by at least some of the light sources; and
    wherein rendering includes rendering an effect of the particular light source on the surface and rendering effect(s) of the other light sources on the surface.

7. The method of claim 1, wherein the storing includes storing a plurality of sets of data in a plurality of textures, wherein at least one texture stores a plurality of sets of data; and
    wherein the rendering includes rendering multiple light sources based at least in part on the plurality of textures, wherein the rendering is performed in a single pass.

8. The method of claim 1, wherein the rendering includes rendering multiple light sources based at least in part on the plurality of sets of data.

9. The method of claim 1, further comprising:
    pre-processing an attenuation map for each light source.

10. A system for rendering individual lights in a graphics environment, comprising:
    a memory;
    a processor configured to store, in the memory, a plurality of sets of data in a single texture, where each set of data is associated with a light source in the graphics environment; and
    the processor configured to render a display of a graphic environment that includes a surface affected by at least some light sources, where the rendering includes rendering specular reflection effects on the surface for each light affecting the surface, where a first specular reflection effect from a first light source is independent of a second specular reflection effect from a second light source.

11. The system of claim 10, wherein the processor is configured to render in a single pass.

12. The system of claim 10, wherein the texture contains a plurality of channels and the processor is configured to store one set of data in a single channel of the texture.

13. The system of claim 10, wherein the texture is a DXT texture.

14. The system of claim 10, wherein the processor is further configured to execute software that includes graphics environments, wherein the display is based at least in part on the executed software.

15. The system of claim 14, wherein being configured to execute includes adjusting the color or intensity of a particular light source, where the adjustment is independent of every other light source;
    wherein the display includes a surface affected by at least some of the light sources; and
    wherein being configured to render includes being configured to render an effect of the particular light source on the surface and being configured to render effect(s) of the other light sources on the surface.

16. The system of claim 14, wherein the processor is configured to store a plurality of sets of data in a plurality of textures, wherein at least one texture stores a plurality of sets of data; and
    wherein the processor is configured to render, in a single pass, multiple light sources based at least in part on the plurality of textures.

17. The system of claim 10, wherein the processor is configured to render multiple light sources based at least in part on the plurality of sets of data.

18. The system of claim 10, wherein the processor is further configured to pre-process an attenuation map for each light source.

19. A non-transitory computer-readable storage medium encoded with instructions configured to be executed by a processor, the instructions which, when executed by the processor, cause the performance of a method, comprising:
    storing a plurality of sets of data in a single texture, where each set of data is associated with a light source in the graphics environment, and
    rendering a display of a graphic environment that includes a surface affected by at least some of the light sources, where the rendering includes rendering specular reflection effects on the surface for each light affecting the surface, where a first specular reflection effect is independent of a second specular reflection effect.

20. The computer-readable storage medium of claim 19, wherein the storing includes storing a plurality of sets of data in a plurality of textures, wherein at least one texture stores a plurality of sets of data, wherein the color of each light source is adjustable independent of the color of any other light source; and
    wherein the rendering includes rendering multiple light sources based at least in part on the plurality of textures, wherein the rendering is performed in a single-pass.

* * * * *